March 7, 1933.    W. H. PETIT ET AL    1,900,730
CAMERA BACK
Filed Dec. 11, 1931    4 Sheets-Sheet 1

INVENTORS
William H. Petit
Edson S. Hineline
BY
Their ATTORNEY

March 7, 1933.    W. H. PETIT ET AL    1,900,730
CAMERA BACK
Filed Dec. 11, 1931    4 Sheets-Sheet 2
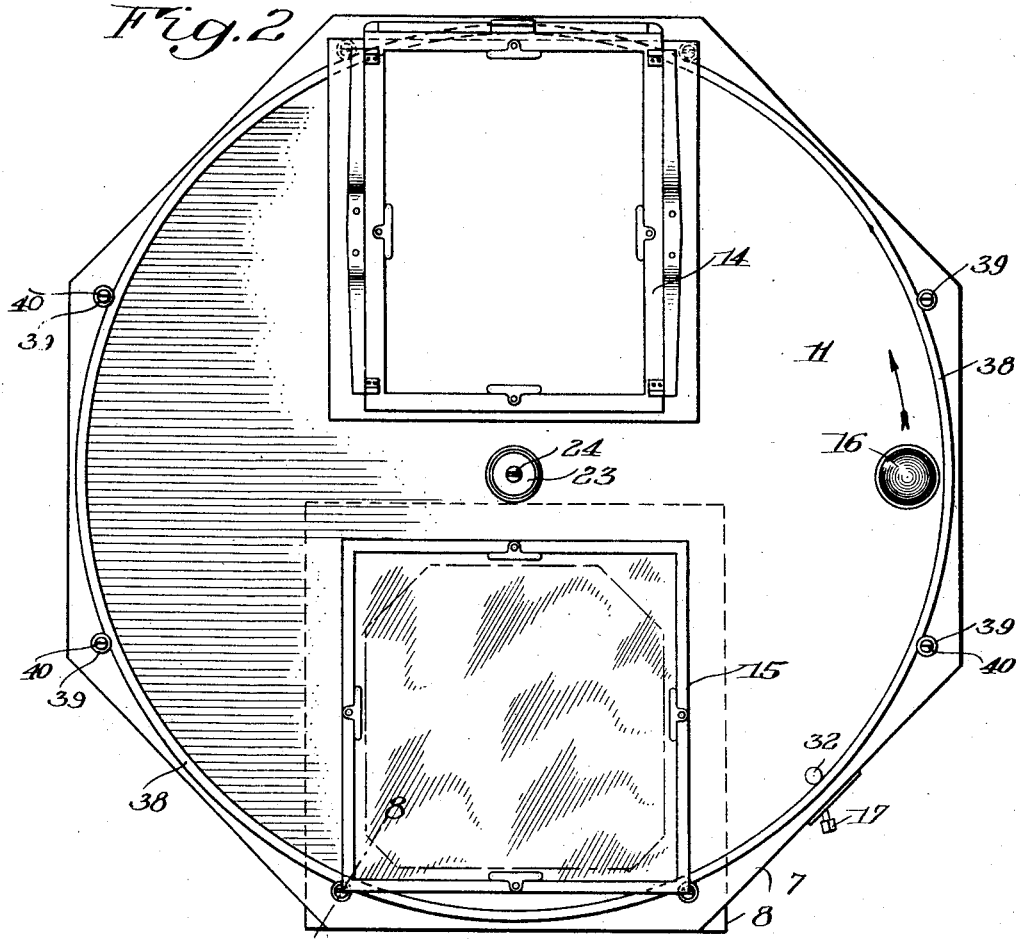
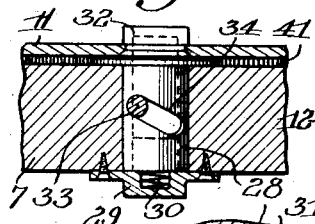
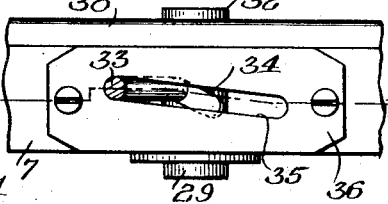
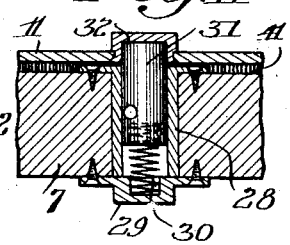
INVENTORS
William H. Petit
Edson S. Fineline
BY
Their ATTORNEY

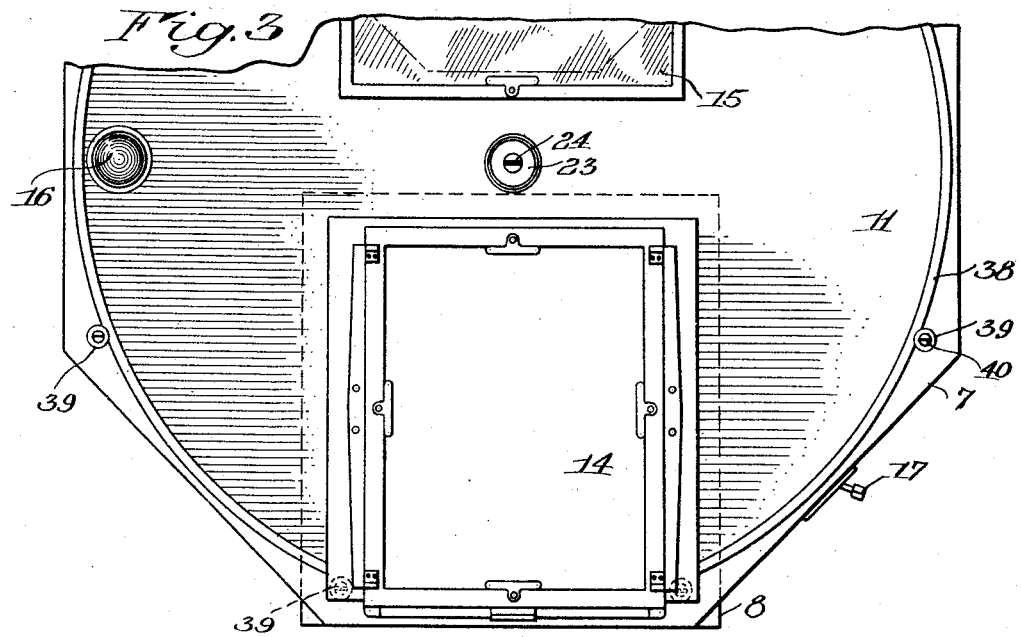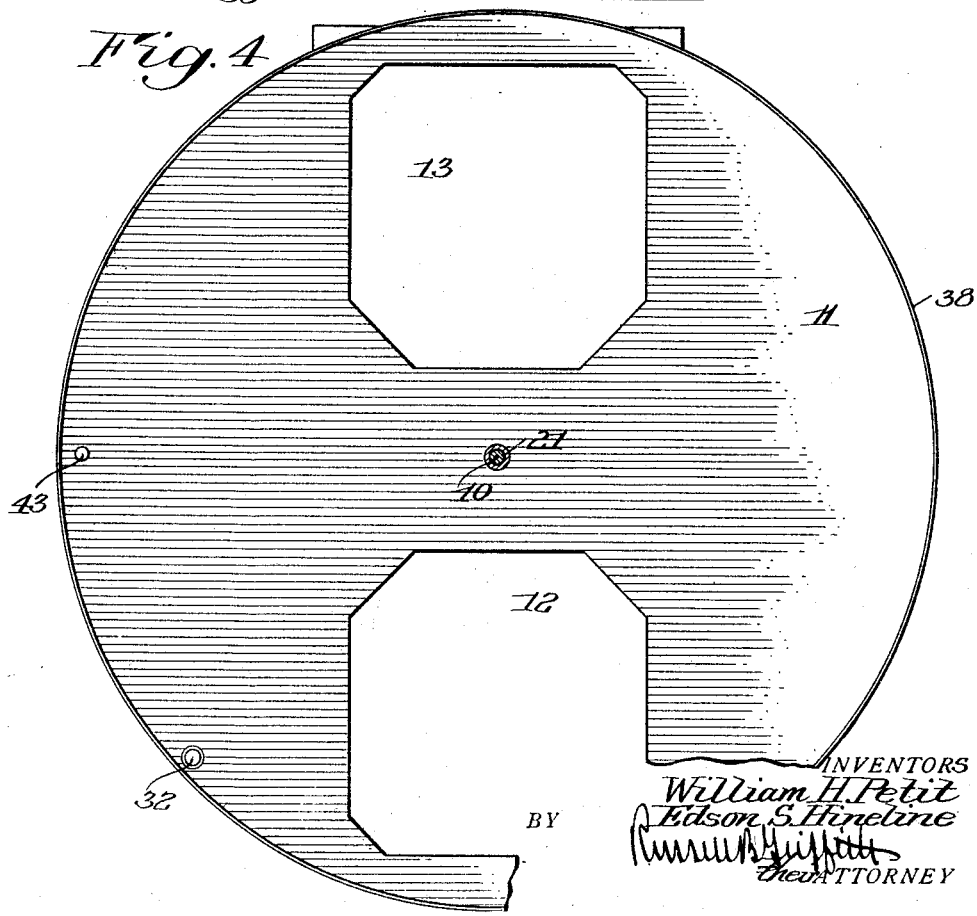

March 7, 1933.  W. H. PETIT ET AL  1,900,730
CAMERA BACK
Filed Dec. 11, 1931    4 Sheets-Sheet 4
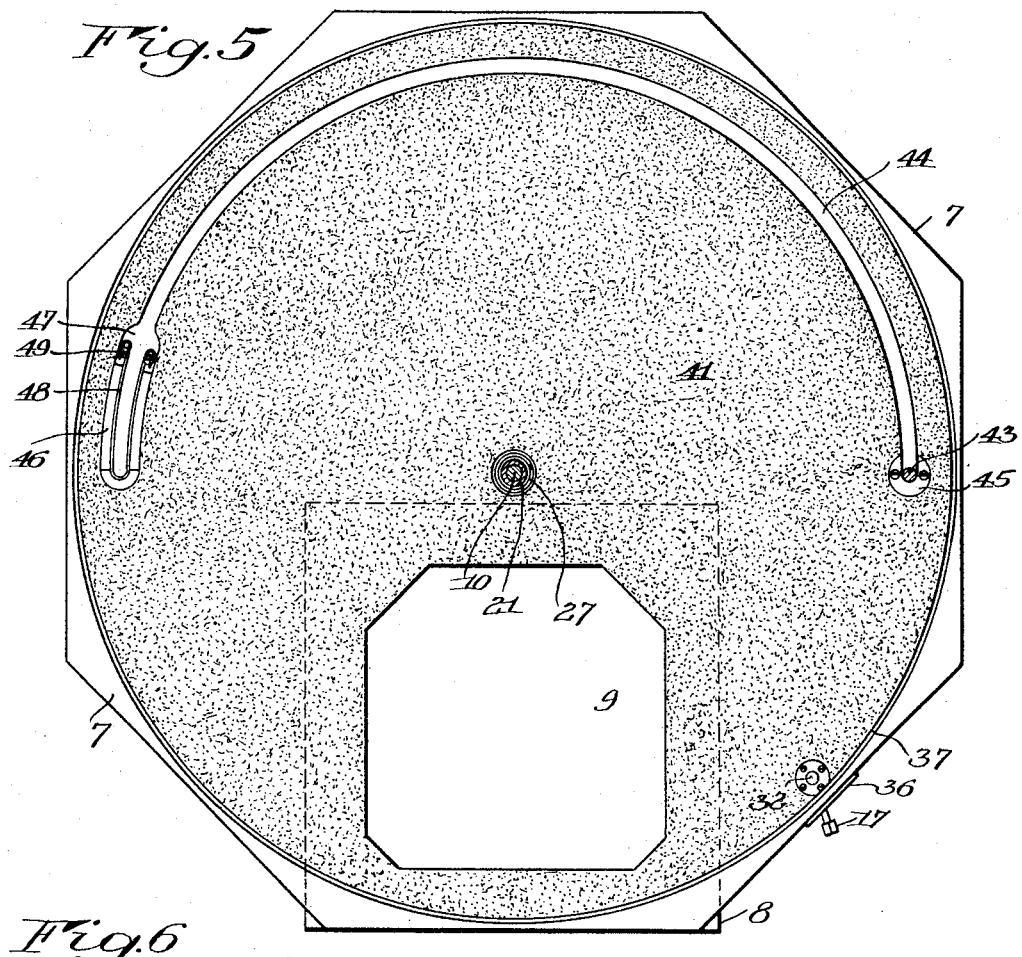
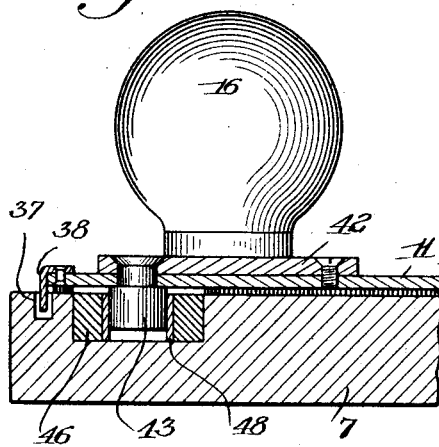
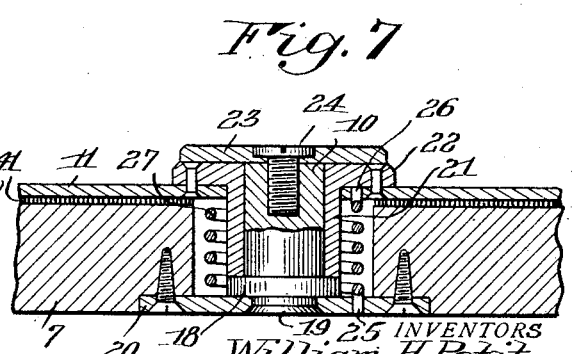

Patented Mar. 7, 1933

1,900,730

UNITED STATES PATENT OFFICE

WILLIAM H. PETIT AND EDSON S. HINELINE, OF ROCHESTER, NEW YORK, ASSIGNORS TO THE FOLMER GRAFLEX CORPORATION, OF ROCHESTER, NEW YORK, A CORPORATION OF DELAWARE

CAMERA BACK

Application filed December 11, 1931. Serial No. 580,302.

Our present invention relates to photography and more particular to photographic cameras, and it has for its object to provide a simple and conveniently operable rotary camera back offering certain facilities whereby first a focusing screen and then a plate holder can be brought into register with an exposure opening in the axis of the camera lens. The improvements are directed in part toward providing a rapidly changing back to the end that the sensitive plate may be brought almost instantly into position for exposure after the image has been brought to a satisfactory focus on the screen, and generally toward providing a smooth working, noiseless, and efficient structure of this kind.

To these and other ends, the invention resides in certain improvements and combinations of parts, all as will be hereinafter more fully described, the novel features being pointed out in the claims at the end of the specification.

In the drawings:

Fig. 2 is a rear elevation of the back, showing the focusing screen in operative position;

Fig. 3 is a similar fragmentary view, showing the plate holder in operative position;

Fig. 4 is a front view of the rotary element;

Fig. 5 is a rear view of the fixed element of the back;

Fig. 6 is an enlarged fragmentary section through the operating and stop knob;

Fig. 7 is an enlarged fragmentary section through the central stud bearing or pivot;

Fig. 9 is a side or edge elevation, enlarged, of the retaining latch with its stem in section;

Fig. 10 is a section through the retaining latch with certain of the cylindrical parts shown in elevation;

Fig. 11 is a similar section with less of the cylindrical parts shown in elevation, and Fig. 12 is a section taken substantially on the line 12—12 of Fig. 9.

Similar reference numerals throughout the several views indicate the same parts.

Figure 1:
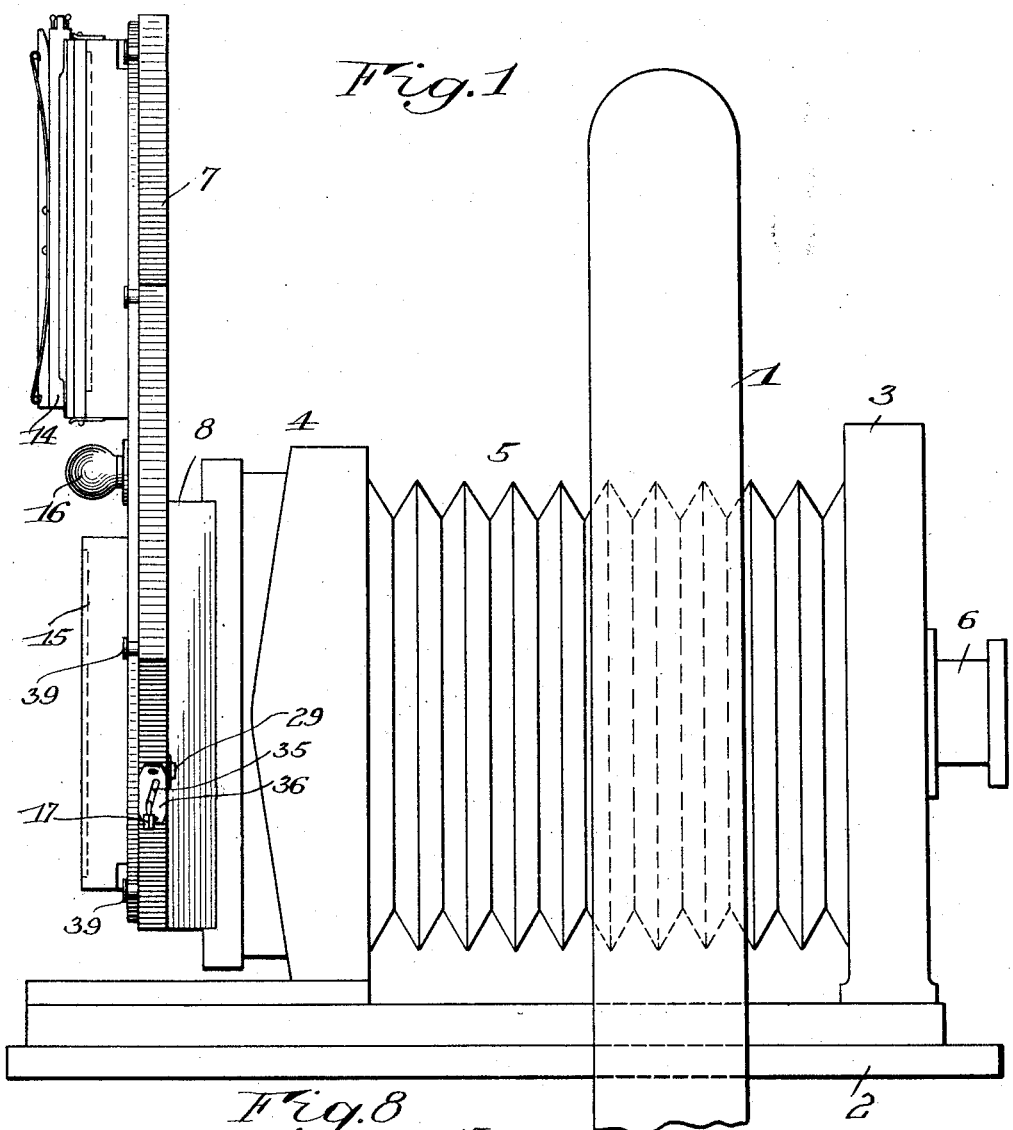
Fig. 1 is a side elevation of a studio camera provided with a revolving back constructed in accordance with and illustrating one embodiment of our invention.

Referring first to Fig. 1, 1 indicates a portion of the general supporting frame of a studio camera comprising the usual major elements, as follows: 2 a bed, 3 and 4, respectively, a front and body relatively adjustable for focusing purposes on the bed and connected by the usual bellows, 5 and 6 a lens tube containing a lens mounted on front 3. The fixed portion of the back involved in this invention is, in the present form, in the form of an octagonal board 7 secured to the rear of the body 4 through a connection indicated at 8 in Fig. 1. The rear of this board with covering parts removed is shown in Fig. 5. Opposite the connection 8 on the body, it is provided with an exposure opening 9 in alinement with the optical axis of the lens tube 6. This exposure opening is at the bottom and offset from a centrally arranged pivoting stud 10, shown in detail section in Fig. 7, as aforesaid, and the details of which will be hereinafter described.

Pivoted on the stud 10 to turn through an angle of 180 degrees is a rotary element 11 of the back. On opposite sides of the pivot, it is provided with diametrically opposed openings 12 and 13, as best shown in Fig. 4, which may be selectively and alternately brought into register with the exposure opening 9 in the fixed element. Secured to the rotary element 11 in normal registry with the opening 12 is a plate holder 14, while similarly secured thereto in registry with openings 13 is a ground glass or similar focusing screen 15, both of which are herein conventionally shown but are recognizable in type to persons skilled in the photographic art. The positions of these two elements, with reference to the exposure opening 9, are normally as shown in Fig. 3, that is, the plate holder is opposite the fixed exposure opening 9.

To first give a general idea of the operation and referring to Fig. 3, an operating knob 16 on the rotary element 11 is used to turn the latter a half rotation from the position of Fig. 3 to that of Fig. 2, which carries the plate holder 14 away from and into a position opposite to the exposure opening 9. Resultantly, the focusing screen 15 is carried down to the right into registry with the exposure opening 9. This winds or tensions a motor spring on the pivot stud 10, which is restrained by a latch element, the operating knob of which is indicated at 17 in the figures.

After the focusing of the image upon the screen 15 is satisfactorily completed, the latch 17 is released and instantly the focusing screen 15 and the plate holder 14 change places and, without delay, the sensitive plate in the holder may be exposed. The exposure mechanism may, of course, be of any usual or preferred type and is not shown, but the construction is such that, if desired, the rotary back itself may function as a shutter also, as will be understood.

Reverting now to the details of the pivoting stud 10 and the spring motor referred to as associated therewith, these are best shown in Fig. 7. As there shown, the stud 10 having a shoulder 18 is riveted at 19 at its base to a plate 20 secured to the front side of the board or fixed element 7. A sleeve 21 is secured by a collar 22 to the rotary disk 11. A cap 23 fastened to the stud by a screw 24 holds this assembly together, and surrounding the sleeve 21 with one end anchored at 25 in the plate 20 and the other end anchored at 26 in the disk 11 is a coil spring 27. It is obvious from this that as the rotary element 11 is turned by the knob 16 from the position of Fig. 3 to that of Fig. 2, as aforesaid, the motor spring 27 will be tensioned. It is so held under tension by the latch 17, shown in detail in Figs. 9 to 12.

Referring now more particularly to these latter figures, a bushing 28 is inset into the board or fixed element 7 and covered on the front side by a cap 29, against which reacts a compression spring 30 that has a normal tendency to press rearwardly a bolt or locking plunger 31 within the bushing. This is in the rotary path of a recess in the rotary element 11 formed by a cap 32. When the motor spring is wound by the rotation of the rotary element to the right, this latching engagement is made, as shown in Fig. 11. The releasing knob 17 of the latch is on a stem 33 that is fastened to and projects radially from the latch bolt 31, and this stem projects through a cam slot 34 in the bushing 28, so that obviously, as it is moved to the right in the figures referred to, it will retract bolt 31 and allow the rotary member to return under the influence of the motor spring and change the plate holder to the position of the focusing screen opposite the exposure opening and vice versa. The stem 33 also extends through a slot 35 in a cover plate 36 on the edge of the fixed element or board 7.

Figure 8:
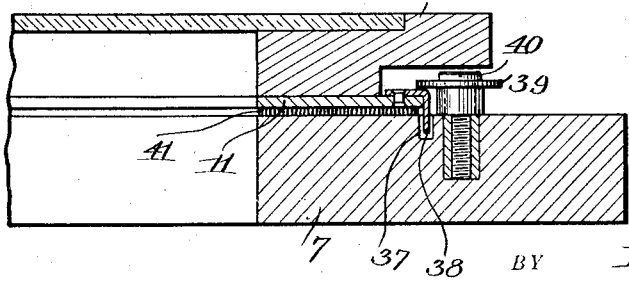
Fig. 8 is an enlarged fragmentary section through the guide bearing taken on the line 8—8 of Fig. 2.

To steady and guide the movements of the relatively rotary elements, we prefer not to depend entirely upon the central stud bearing 10. For this purpose, the fixed board 7 is provided with a circular groove 37 (Fig. 6) to receive a flange plate 38 on the periphery of the rotary disk 11, which flange plate (Fig. 8) is held down and causes the rotary disk to maintain close contact with the rear surface of the board 7 by means of shoulder washers 39 on a plurality of screw posts 40 fastened in the board 7. This flange construction is also and really primarily designed to function as a light seal between the two elements 7 and 8, for which purpose the rear face of the fixed board 7 is preferably covered with a black pile fabric 41, indicated by the stippling in Fig. 5.

Of course, a stop is provided for limiting the setting movement of the rotary element 11 and also properly limiting its return movement under the influence of the motor spring. To these ends, the mounting plate 42, by which the operating knob 16 is secured to the rotary element 11, has riveted thereto a forwardly projecting pin 43. This travels in a semi-circular groove 44 in the fixed board 7. At the right end thereof, as shown in Fig. 5, is an escutcheon 45 defining the winding limit. At the left end is a buffer or shock absorbing device, in the present form, of a U-shaped rubber lining 46 in an enlargement 47 of the groove. A yoke-shaped metal lining 48 for this rubber insert is yieldably held in shape by screws 49. This lining not only saves wear on the rubber but closely, though yieldingly, fits the pin 43, so that it may also act frictionally to arrest the pin and reduce the shock.

We claim as our invention:

1. In a camera back, the combination with a mounting board having an exposure opening in the axis of the camera lens, of a rotary back mounted on the board to turn through an angle of one hundred and eighty degrees, a focusing screen and a plate holder diametrically oppositely arranged on the back to alternately register with the exposure opening in the board, and an operating spring for the back tensioned by the movement of the focusing screen into such register and adapted to return the back to a position in which the plate holder is in register.

2. In a camera back, the combination with a mounting board having an exposure opening in the axis of the camera lens, of a rotary back mounted on the board to turn through an angle of one hundred and eighty degrees, a focusing screen and a plate holder diametrically oppositely arranged on the back to alternately register with the exposure opening in the board, an operating spring for the back tensioned by the movement of the focusing screen into such register and adapted to return the back to a position in which the plate holder is in register, means for operating the back to tension the spring, and a releasable catch for holding the back while the screen is in operative position.

3. In a camera back, the combination with a mounting board having an offset exposure opening in the axis of the camera lens, of a rotary back in the form of a disk pivotally mounted centrally of the board, a focusing screen and a plateholder carried by the disk to alternately register with the exposure opening in the board, a spring encircling the pivot of the disk and adapted to reverse the positions of the screen and plate holder with reference to the exposure opening, and a releasable catch for holding the disk with the spring under tension.

4. In a camera back, the combination with a mounting board having an offset exposure opening in the axis of the camera lens, of a rotary back in the form of a disk pivotally mounted centrally of the board, a focusing screen and a plate holder carried by the disk to alternately register with the exposure opening in the board, a spring encircling the pivot of the disk and adapted to reverse the positions of the screen and plate holder with reference to the exposure opening, and a releasable catch for holding the disk with the spring under tension, the board and disk being respectively provided with annular cooperating guiding grooves and flanges and the board with elements holding the disk thereagainst.

5. In a camera back, the combination with a mounting board having an offset exposure opening in the axis of the camera lens, of a rotary back in the form of a disk pivotally mounted centrally of the board, a focusing screen and a plate holder carried by the disk to alternately register with the exposure opening in the board, a spring encircling the pivot of the disk and adapted to reverse the positions of the screen and plate holder with reference to the exposure opening, a releasable catch for holding the disk with the spring under tension, a buffer on the board and a cooperating element on the disk adapted to absorb the shock of the spring action.

WILLIAM H. PETIT.
EDSON S. HINELINE.